(12) United States Patent
Justak

(10) Patent No.: US 8,919,781 B2
(45) Date of Patent: Dec. 30, 2014

(54) SELF-ADJUSTING NON-CONTACT SEAL

(71) Applicant: John F. Justak, Stuart, FL (US)

(72) Inventor: John F. Justak, Stuart, FL (US)

(73) Assignee: Advanced Technologies Group, Inc., Stuart, FL (US)

( * ) Notice: Subject to any disclaimer, the term of this patent is extended or adjusted under 35 U.S.C. 154(b) by 133 days.

(21) Appl. No.: 13/836,211

(22) Filed: Mar. 15, 2013

(65) Prior Publication Data
US 2013/0234399 A1    Sep. 12, 2013

Related U.S. Application Data

(63) Continuation-in-part of application No. 13/009,155, filed on Jan. 19, 2011, now Pat. No. 8,641,045, which is a continuation-in-part of application No. 11/953,099, filed on Dec. 10, 2007, now Pat. No. 7,896,352, which is a continuation-in-part of application No. 11/669,454, filed on Jan. 31, 2007, now Pat. No. 7,410,173, which is a continuation-in-part of application No. 11/226,836, filed on Sep. 14, 2005, now Pat. No. 7,182,345, which is a continuation of application No. 10/832,053, filed on Apr. 26, 2004, now abandoned.

(60) Provisional application No. 60/466,979, filed on May 1, 2003.

(51) Int. Cl.
  *F16J 15/44*  (2006.01)
  *F01D 11/02*  (2006.01)
  *F01D 11/08*  (2006.01)

(52) U.S. Cl.
  CPC ............ *F16J 15/44* (2013.01); *F01D 11/08* (2013.01); *F01D 11/025* (2013.01); *F16J 15/442* (2013.01)
  USPC ......................................... 277/411; 277/412

(58) Field of Classification Search
  CPC ...... F16J 15/442; F16J 15/441; F01D 11/025; F01D 11/08; F01D 25/246
  USPC .................................................. 277/411–413
  See application file for complete search history.

(56) References Cited

U.S. PATENT DOCUMENTS

| | | |
|---|---|---|
| 3,594,010 A | 7/1971 | Warth |
| 3,917,150 A | 11/1975 | Ferguson et al. |
| 3,975,114 A | 8/1976 | Kalkbrenner |
| 4,411,594 A | 10/1983 | Pellow et al. |
| 4,600,202 A | 7/1986 | Schaeffler et al. |
| 4,642,024 A | 2/1987 | Weidner |
| 4,650,394 A | 3/1987 | Weidner |
| 4,676,715 A | 6/1987 | Imbault et al. |
| 5,026,252 A | 6/1991 | Hoffelner |

(Continued)

FOREIGN PATENT DOCUMENTS

| | | |
|---|---|---|
| DE | 957 006 A | 1/1957 |
| EP | 0 778 431 A1 | 6/1997 |

(Continued)

*Primary Examiner* — Vishal Patel
(74) *Attorney, Agent, or Firm* — GrayRobinson, PA

(57) ABSTRACT

A self-adjusting non-contact seal for sealing the circumferential gap between a first machine component and a second machine component includes structure which undergoes wear in the event of inadvertent contact with one of the machine components in such a way as to allow a reset of its radial distance from such machine component, compared to initial installation tolerances, while minimizing leakage.

7 Claims, 8 Drawing Sheets

(56) References Cited

U.S. PATENT DOCUMENTS

| | | | |
|---|---|---|---|
| 5,181,728 A | 1/1993 | Stec | |
| 5,183,197 A | 2/1993 | Howe | |
| 5,362,072 A * | 11/1994 | Dalton | 277/413 |
| 5,755,445 A | 5/1998 | Arora | |
| 5,799,952 A | 9/1998 | Morrison et al. | |
| 5,944,320 A | 8/1999 | Werner et al. | |
| 5,993,150 A * | 11/1999 | Liotta et al. | 415/115 |
| 5,997,004 A | 12/1999 | Braun et al. | |
| 6,079,714 A | 6/2000 | Kemsley | |
| 6,079,945 A | 6/2000 | Wolfe et al. | |
| 6,254,344 B1 | 7/2001 | Wright et al. | |
| 6,331,006 B1 * | 12/2001 | Baily et al. | 277/355 |
| 6,428,009 B2 | 8/2002 | Justak | |
| 6,435,820 B1 * | 8/2002 | Overberg | 415/138 |
| 6,558,041 B2 | 5/2003 | Laos | |
| 6,572,115 B1 | 6/2003 | Sarshar et al. | |
| 6,733,233 B2 * | 5/2004 | Jasklowski et al. | 415/135 |
| 6,840,519 B2 | 1/2005 | Dinc et al. | |
| 7,182,345 B2 | 2/2007 | Justak | |
| 7,600,967 B2 * | 10/2009 | Pezzetti et al. | 415/173.1 |
| 8,641,045 B2 * | 2/2014 | Justak | 277/412 |
| 2004/0100035 A1 | 5/2004 | Turnquist et al. | |
| 2011/0182719 A1 | 7/2011 | Deo et al. | |

FOREIGN PATENT DOCUMENTS

| | | |
|---|---|---|
| GB | 355570 A | 8/1931 |
| JP | 4347066 A | 12/1992 |
| WO | 01/48887 A2 | 7/2001 |

* cited by examiner

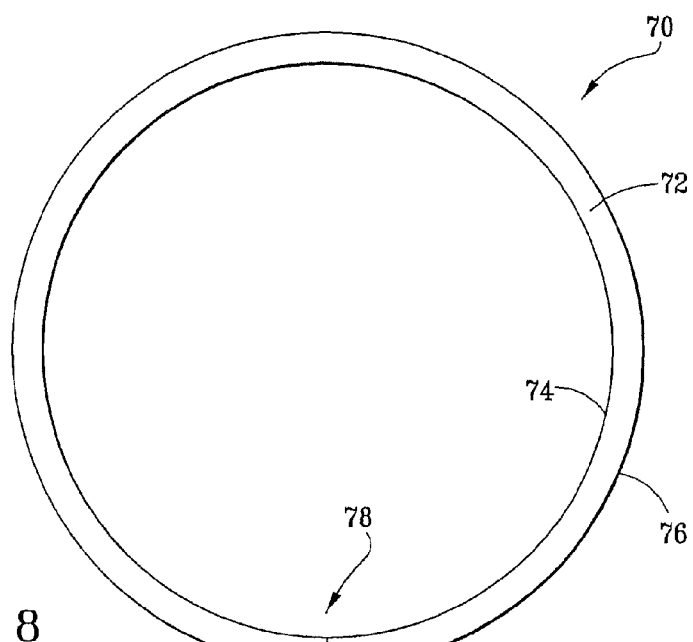
FIG. 8
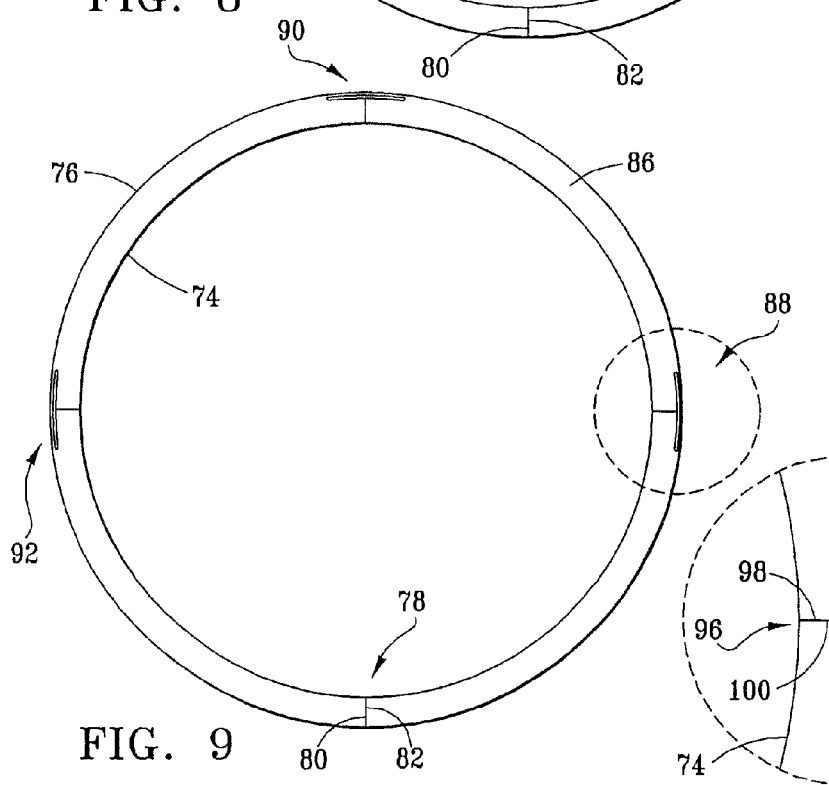
FIG. 9
FIG. 9A

SELF-ADJUSTING NON-CONTACT SEAL

RELATED APPLICATIONS

This application is a continuation-in-part application of U.S. patent application Ser. No. 13/009,155 filed Jan. 19, 2011, which is a continuation-in-part application of U.S. patent application Ser. No. 11/953,099 filed Dec. 10, 2007 and now U.S. Pat. No. 7,896,352, which is a continuation-in-part application of U.S. patent application Ser. No. 11/669,454 filed Jan. 31, 2007 and now U.S. Pat. No. 7,410,173, which is a continuation-in-part application of U.S. patent application Ser. No. 11/226,836 filed Sep. 14, 2005 and now U.S. Pat. No. 7,182,345, which is a continuation of U.S. patent application Ser. No. 10/832,053 filed Apr. 26, 2004, now abandoned, which claims the benefit of U.S. Provisional Application Ser. No. 60/466,979 filed May 1, 2003, under 35 U.S.C. §119(e) for all commonly disclosed subject matter. U.S. Provisional Application Ser. No. 60/466,979 is expressly incorporated herein by reference in its entirety to form part of the present disclosure.

FIELD OF THE INVENTION

This invention relates to seals for sealing a circumferential gap between two machine components that are relatively rotatable with respect to each other, and, more particularly, to a non-contact seal having at least one shoe formed with a nozzle and two or more projections which are effective to reset the radial position of the at least on shoe relative to one of the machine components in the event of inadvertent contact and wear of such projections in order to substantially maintain a non-contact seal of the circumferential gap between such machine components.

BACKGROUND OF THE INVENTION

Turbomachinery, such as gas turbine engines employed in aircraft, currently is dependent on either labyrinth (see FIGS. 1A-1E), brush (see FIGS. 2A and 2B) or carbon seals for critical applications. Labyrinth seals provide adequate sealing but they are extremely dependent on maintaining radial tolerances at all points of engine operation. The radial clearance must take into account factors such as thermal expansion, shaft motion, tolerance stack-ups, rub tolerance, etc. Minimization of seal clearance is necessary to achieve maximum labyrinth seal effectiveness. In addition to increased leakage if clearances are not maintained, such as during a high-G maneuver, there is the potential for increases in engine vibration. Straight-thru labyrinth seals (FIG. 1A) are the most sensitive to clearance changes, with large clearances resulting in a carryover effect. Stepped labyrinth seals (FIGS. 1B and 1C) are very dependent on axial clearances, as well as radial clearances, which limits the number of teeth possible on each land. Pregrooved labyrinth seals (FIG. 1D) are dependent on both axial and radial clearances and must have an axial clearance less than twice the radial clearance to provide better leakage performance than stepped seals.

Other problems associated with labyrinth seals arise from heat generation due to knife edge to seal land rub, debris from hardcoated knife edges or seal lands being carried through engine passages, and excessive engine vibration. When seal teeth rub against seal lands, it is possible to generate large amounts of heat. This heat may result in reduced material strength and may even cause destruction of the seal if heat conducted to the rotor causes further interference. It is possible to reduce heat generation using abradable seal lands, but they must not be used in situations where rub debris will be carried by leakage air directly into critical areas such as bearing compartments or carbon seal rubbing contacts. This also holds true for hardcoats applied to knife edges to increase rub capability. Other difficulties with hardcoated knife edges include low cycle fatigue life debits, rub induced tooth-edge cracking, and the possibility of handling damage. Engine vibration is another factor to be considered when implementing labyrinth seals. As mentioned previously, this vibration can be caused by improper maintenance of radial clearances. However, it can also be affected by the spacing of labyrinth seal teeth, which can produce harmonics and result in high vibratory stresses.

In comparison to labyrinth seals, brush seals can offer very low leakage rates. For example, flow past a single stage brush seal is approximately equal to a four knife edge labyrinth seal at the same clearance. Brush seals are also not as dependent on radial clearances as labyrinth seals. Leakage equivalent to approximately a 2 to 3 mil gap is relatively constant over a large range of wire-rotor interferences. However, with current technology, all brush seals will eventually wear to line on line contact at the point of greatest initial interference. Great care must be taken to insure that the brush seal backing plate does not contact the rotor under any circumstances. It is possible for severing of the rotor to occur from this type of contact. In addition, undue wire wear may result in flow increases up to 800% and factors such as changes in extreme interference, temperature and pressure loads, and rubbing speeds must be taken into account when determining seal life.

The design for common brush seals, as seen in FIGS. 2A and 2B, is usually an assembly of densely packed flexible wires sandwiched between a front plate and a back plate. The free ends of the wires protrude beyond the plates and contact a land or runner, with a small radial interference to form the seal. The wires are angled so that the free ends point in the same direction as the movement of the runner. Brush seals are sized to maintain a tight diametral fit throughout their useful life and to accommodate the greatest combination of axial movement of the brush relative to the rotor.

Brush seals may be used in a wide variety of applications. Although brush seal leakage generally decreases with exposure to repeated pressure loading, incorporating brush seals where extreme pressure loading occurs may cause a "blow over" condition resulting in permanent deformation of the seal wires. Brush seals have been used in sealing bearing compartments, however coke on the wires may result in accelerated wear and their leakage rate is higher than that of carbon seals.

One additional limitation of brush seals is that they are essentially uni-directional in operation, i.e., due to the angulation of the individual wires, such seals must be oriented in the direction of rotation of the moving element. Rotation of the moving element or rotor in the opposite direction, against the angulation of the wires, can result in permanent damage and/or failure of the seal. In the particular application of the seals required in the engine of a V-22 Osprey aircraft, for example, it is noted that during the blade fold wing stow operation, the engine rotates in reverse at very low rpm's. This is required to align rotor blades when stowing wings. This procedure is performed for creating a smaller aircraft footprint onboard an aircraft carrier. Reverse rotation of the engine would damage or create failure of brush seals such as those depicted in FIGS. 2A and 2B.

Carbon seals are generally used to provide sealing of oil compartments and to protect oil systems from hot air and contamination. Their low leakage rates in comparison to labyrinth or brush seals are well-suited to this application but they are very sensitive to pressure balances and tolerance stack-ups. Pressure gradients at all operating conditions and especially at low power and idle conditions must be taken into account when considering the use of carbon seals. Carbon seals must be designed to have a sufficiently thick seal plate and the axial stack load path must pass through the plate as straight as possible to prevent coning of the seal. Another consideration with carbon seals is the potential for seepage, weepage or trapped oil. Provisions must be made to eliminate these conditions which may result in oil fire, rotor vibration, and severe corrosion.

According to the Advanced Subsonic Technology Initiative as presented at the NASA Lewis Research Center Seals Workshop, development of advanced sealing techniques to replace the current seal technologies described above will provide high returns on technology investments. These returns include reducing direct operating costs by up to 5%, reducing engine fuel burn up to 10%, reducing engine oxides of emission by over 50%, and reducing noise by 7 dB. For example, spending only a fraction of the costs needed to redesign and re-qualify complete compressor or turbine components on advanced seal development can achieve comparable performance improvements. In fact, engine studies have shown that by applying advanced seals techniques to just a few locations can result in reduction of 2.5% in SFC.

SUMMARY OF THE INVENTION

This invention is directed to a non-contact seal for sealing the circumferential gap between a first machine component such as a stator and a second machine component such as a rotor which has the capability of resetting the radial distance between itself and the rotor or stator in the event of inadvertent contact during operation.

In one presently preferred embodiment, the seal comprises at least one shoe extending along one of the rotor and stator in a position to create a non-contact seal therewith. At least one spring element is connected between one of the rotor and stator and the at least one shoe. The spring element(s) is flexible in the radial direction, but axially stiff so that it can function to assist in preventing roll over of the shoes with respect to the rotor or stator where it is located, thus maintaining an effective seal under pressure load. Preferably, stops are provided to limit the extent of radial motion of the shoe with respect to the rotor or stator. The spring elements deflect and move with the shoe(s) in response to the application of fluid pressure to the shoe(s) to create a primary seal, within design tolerances, along the gap between the machine components.

The shoe(s) is formed with a slot that receives at least two secondary sealing elements which are oriented side-by-side and are connected to one of the first and second machine components. The secondary sealing elements radially deflect and move with the shoe(s) in response to the application of fluid pressure applied to the shoe(s) to assist in the creation of a secondary seal along the gap between the machine components. Preferably, each of the secondary sealing elements comprises an annular plate, which, in alternative embodiments described below, may be formed with structure to enhance the radial deflection thereof The secondary sealing elements may be formed of sheet metal of varying thickness, or other suitable heat-resistant, flexible material.

In a further embodiment of this invention, the shoe(s) is formed with structure which undergoes wear in the event of inadvertent contact with one of the machine components in such a way as to allow the shoe(s) to reset its/their radial distance from such machine component compared to initial installation tolerances while minimizing leakage.

DESCRIPTION OF THE DRAWINGS

The structure, operation and advantages of this invention will become further apparent upon consideration of the following description, taken in conjunction with the accompanying drawings, wherein:

FIG. 8 is an elevational view of an alternative embodiment of the sealing elements of this invention;

FIG. 9 is an elevational view of a further embodiment of the sealing elements herein;

FIG. 9A is an enlarged view of the encircled portion of FIG. 9;

DETAILED DESCRIPTION OF THE PREFERRED EMBODIMENTS

Figure 1A:
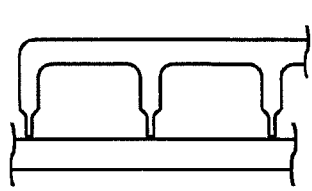
FIGS. 1A-1E are schematic views of a number of prior art labyrinth seals.
Figure 1B:
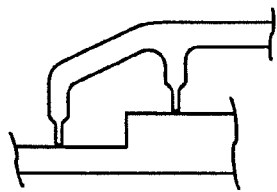
Figure 1C:
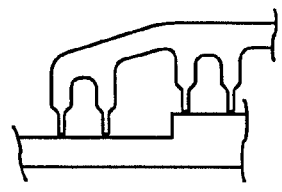
Figure 1D:
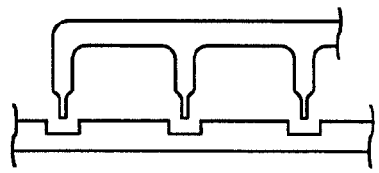
Figure 1E:
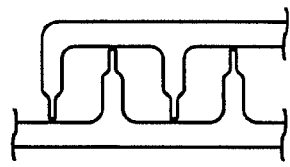
Figure 2A:
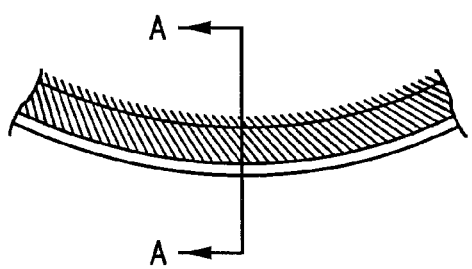
FIGS. 2A and 2B depict views of a prior art brush seal.
Figure 2B:
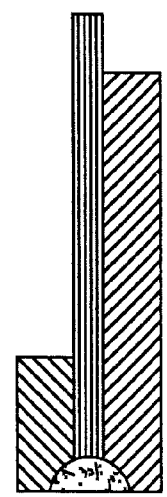

Referring now to FIGS. 3-6, one embodiment of a seal 10 according to this invention is illustrated which creates a non-contact seal of the circumferential gap 11 between two relatively rotating components, namely, a fixed stator 12 and a rotating rotor 14. The seal 10 includes at least one, but preferably a number of circumferentially spaced shoes 16 which are located in a non-contact position along the exterior surface of the rotor 14. Each shoe 16 is formed with a sealing surface 20 and a slot 22 extending radially inwardly toward the sealing surface 20. For purposes of the present discussion, the term "axial" or "axially spaced" refers to a direction along the longitudinal axis of the stator 12 and rotor 14, e.g. axis 18 shown in FIGS. 3 and 6, whereas "radial" refers to a direction perpendicular to the longitudinal axis 18.

Figure 3:
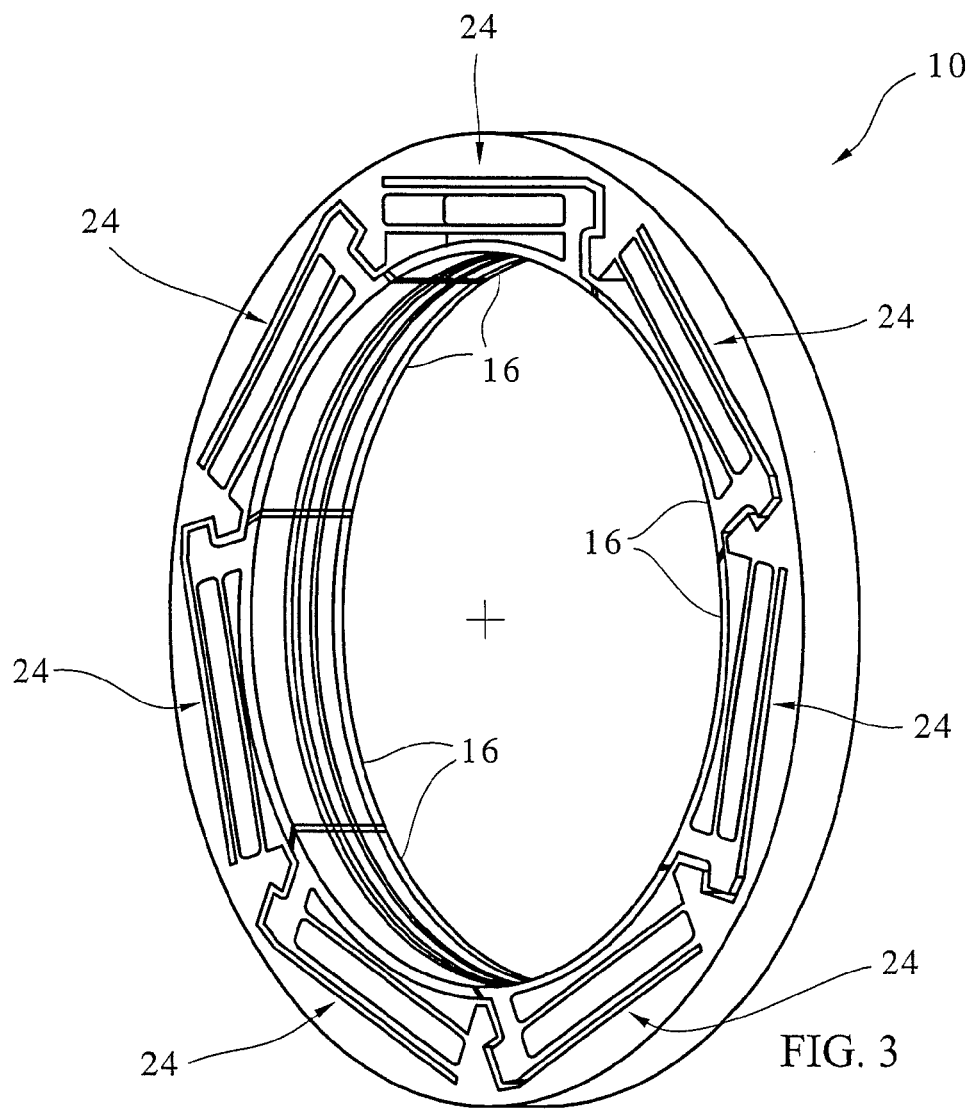
FIG. 3 is a perspective view of the hybrid seal of this invention.
Figure 4:
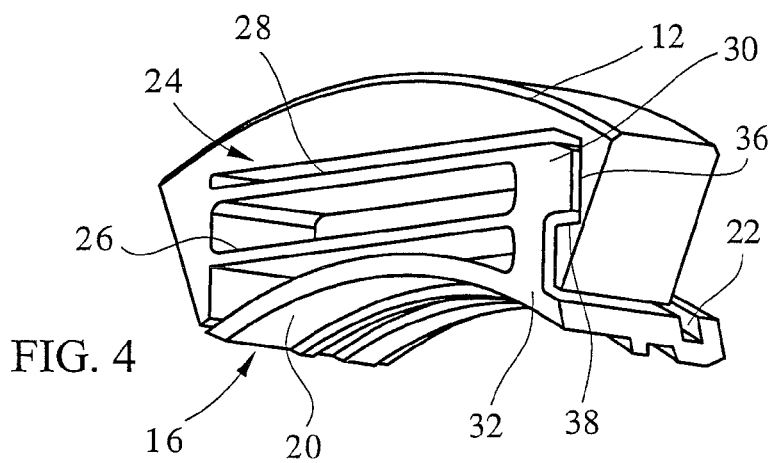
FIG. 4 is an enlarged perspective view of a portion of the seal depicted in FIG. 3, with the sealing elements removed.
Figure 5:
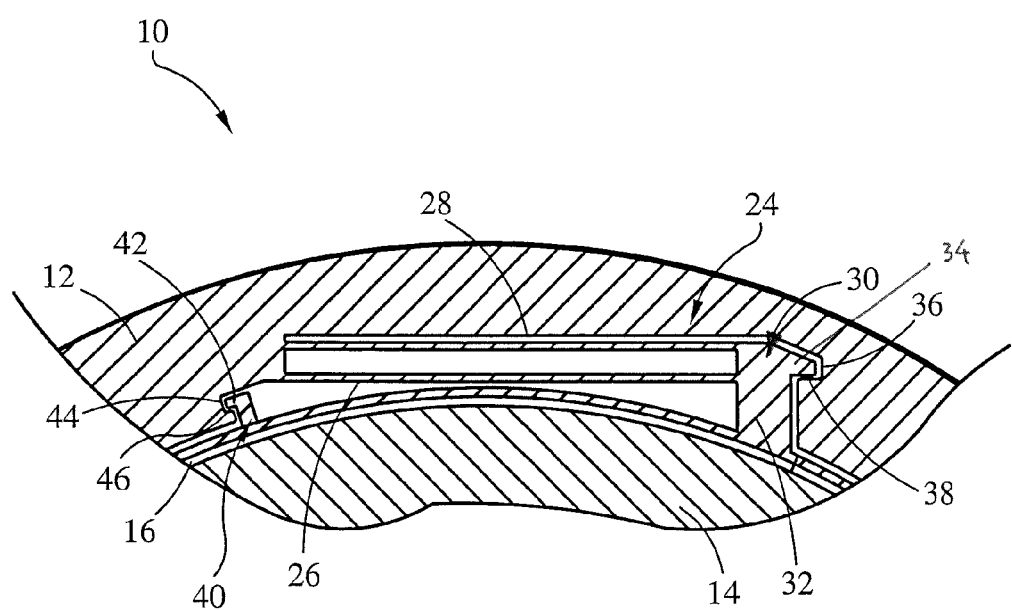
FIG. 5 is a cross sectional view of one of the spring elements and shoes.

Under some operating conditions, particularly at higher pressures, it is desirable to limit the extent of radial movement of the shoes 16 with respect to the rotor 14 to maintain tolerances, e.g. the spacing between the shoes 16 and the facing surface of the rotor 14. The seal 10 preferably includes a number of circumferentially spaced spring elements 24, the details of one of which are best seen in FIGS. 3 and 4. Each spring element 24 is formed with an inner band 26, and an outer band 28 radially outwardly spaced from the inner band 26. One end of each of the bands 26 and 28 is mounted to or integrally formed with the stator 12 and the opposite end thereof is connected to a first stop 30. The first stop 30 includes a leg 32 which is connected to or integrally formed with a shoe 16, and has an arm 34 opposite the shoe 16 which may be received within a recess 36 formed in the stator 12. The recess 36 has a shoulder 38 positioned in alignment with the arm 34 of the first stop 30.

A second stop 40 is connected to or integrally formed with the shoe 16. The second stop 40 is circumferentially spaced from the first stop 30 in a position near the point at which the inner and outer bands 26 and 28 connect to the stator 12. The second stop 40 is formed with an arm 42 which may be received within a recess 44 in the stator 12. The recess 44 has a shoulder 46 positioned in alignment with the arm 42 of second stop 40.

Particularly when the seal 10 of this invention is used in applications such as gas turbine engines, aerodynamic forces are developed which apply a fluid pressure to the shoe 16 causing it to move radially inwardly toward the rotor 14. The spring elements 24 deflect and move with the shoe 16 to create a primary seal of the circumferential gap 11 between the rotor 14 and stator 12. The purpose of first and second stops 30 and 40 is to limit the extent of radially inward and outward movement of the shoe 16 with respect to the rotor 14. A gap is provided between the arm 34 of first stop 30 and the shoulder 38, and between the arm 42 of second stop 40 and shoulder 46, such that the shoe 16 can move radially inwardly relative to the rotor 14. Such inward motion is limited by engagement of the arms 34, 42 with shoulders 38 and 46, respectively, to prevent the shoe 16 from contacting the rotor 14 or exceeding design tolerances for the gap between the two. The arms 34 and 42 also contact the stator 12 in the event the shoe 16 moves radially outwardly relative to the rotor 14, to limit movement of the shoe 16 in that direction.

Figure 6:
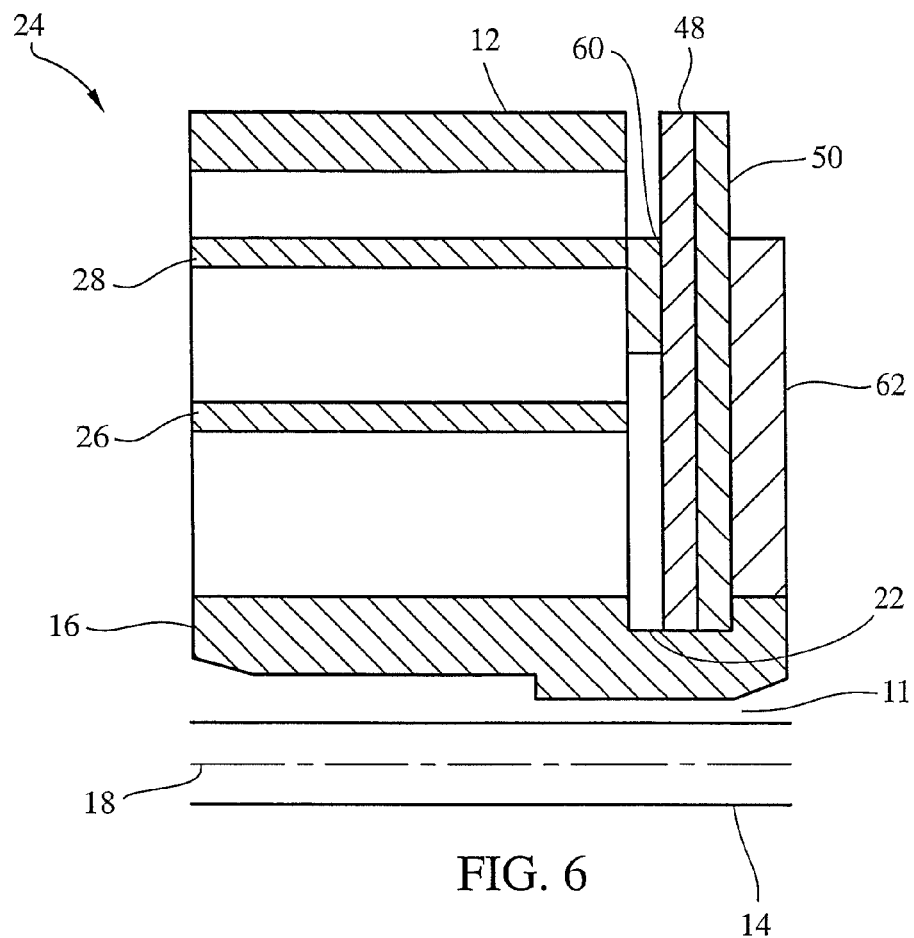
FIG. 6 is a cross sectional view of the seal shown in FIGS. 3 and 4 with the sealing elements inserted.
Figure 7:
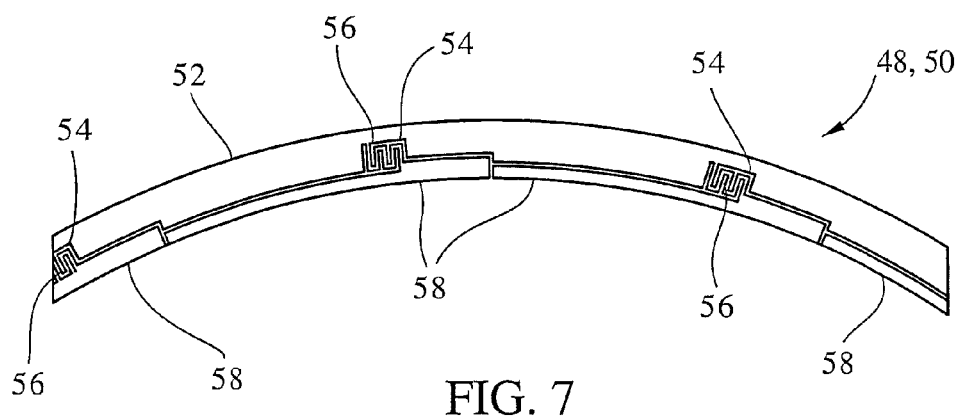
FIG. 7 is an elevational view of a portion of a sealing element.

In one presently preferred embodiment illustrated in FIGS. 6 and 7, the seal 10 is also provided with a secondary seal comprising a stack of at least two secondary sealing elements 48 and 50. Each of the secondary sealing elements 48 and 50 comprises an outer ring 52 formed with a number of circumferentially spaced openings 54, a spring member 56 mounted within each opening 56 and a number of inner ring segments 58 each connected to at least one of the spring members 56. The spring member 56 is depicted in FIG. 7 as a series of connected loops, but it should be understood that spring member 56 could take essentially any other form, including parallel bands as in the spring elements 24. The secondary sealing elements 48 and 50 are oriented side-by-side and positioned so that the inner ring segments 58 extend into the slot 22 formed in the shoe 16. The spring members 56 deflect with the radial inward and outward movement of the shoe 16, in response to the application of fluid pressure as noted above, and create a secondary seal of the gap 11 between the rotor 14 and stator 12. As such, the secondary sealing elements 58 and 50 assist the spring elements 24 in maintaining the shoe 16 within design clearances relative to the rotor 14.

In the presently preferred embodiment, the secondary sealing elements 48 and 50 are formed of sheet metal or other suitable flexible, heat-resistant material. The secondary sealing elements 48 and 50 may be affixed to one another, such as by welding, a mechanical connection or the like, or they may merely placed side-by-side within the slot 22 with no connection between them. In order to prevent fluid from passing through the openings 54 in the outer ring 52 of each secondary sealing element 48 and 50, adjacent sealing elements are arranged so that the outer ring 52 of one secondary sealing element 48 covers the openings 54 in the adjacent secondary sealing element 50. Although not required, a front plate 60 may be positioned between the spring element 24 and the secondary sealing element 48, and a back plate 62 may be located adjacent to the secondary sealing element 50 for the purpose of assisting in supporting the secondary sealing elements 48, 50 in position within the shoe 16. See FIG. 5.

Referring now to FIGS. 8-10A, alternative embodiments of secondary sealing elements according to this invention are illustrated. Considering initially the embodiment shown in FIG. 8, a secondary sealing element 70 is shown which comprises an annular plate 72 having an inner edge 74 and an outer edge 76 that is spaced from the inner edge 74. A slit 78 extends from the inner edge 74 to the outer edge 76 thus forming two ends 80 and 82 of the annular plate 72 which abut one another.

An alternative embodiment of a secondary sealing element 84 is depicted in FIGS. 9 and 9A. In this embodiment, the secondary sealing element 84 comprises an annular plate 86 formed of the same material as annular plate 72. The annular plate 86 has the same inner and outer edges 74, 76, slit 78 and ends 80, 82 described above in connection with a discussion of FIG. 8, but with the addition of three cut-outs 88, 90 and 92. The cut-outs 88 and 92 are preferably spaced about 90° from cut-out 90, and about 90° from the slit 78. As best seen in FIG. 9A, the cut-out 88 comprises an elongated slot 94 that extends part way along and is radially inwardly spaced from the outer edge 76 of the annular plate 86. A break line 96 is formed between the inner edge 74 of the annular plate 86 and the slot 94 defining opposed ends 98, 100 which abut one another. The break line 96 is preferably substantially perpendicular to the slot 94. All of the cut-outs 88-92 are identical, and therefore cut-outs 90 and 92 have the same construction as described above with reference to cut-out 88.

Figure 10:
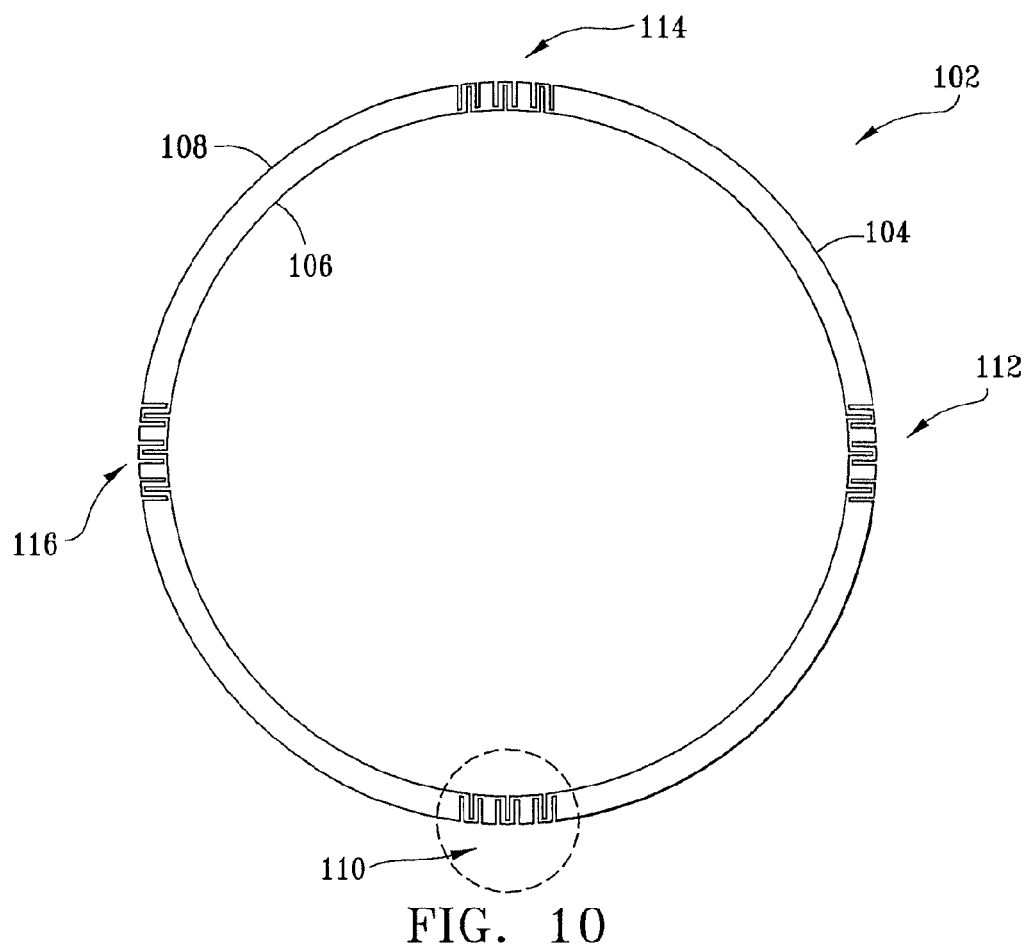
FIG. 10 is an elevational view of still another embodiment of the sealing elements of this invention.
Figure 10A:
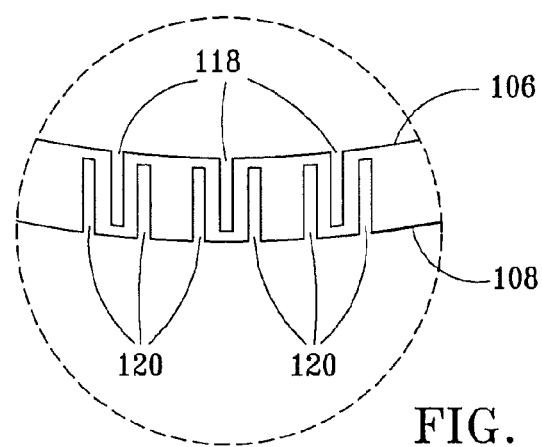
FIG. 10A is an enlarged view of the encircled portion of FIG. 10.

Referring now to FIGS. 10 and 10A, a still further embodiment of a secondary sealing element 102 is shown. The secondary sealing element 102 comprises an annular plate 104 having an inner edge 106 and an outer edge 108 spaced from the inner edge 106. Preferably, four deflection structure 110, 112, 114 and 116 are formed in the annular plate 102 at approximately 90° intervals about its circumference. As best seen in FIG. 10A, each of the deflection structures 110-116 includes a number of circumferentially spaced inner recesses 118 that extend from the inner edge 106 toward the outer edge 108, and a number of circumferentially spaces outer recesses 120 that extend from the outer edge 108 toward the inner edge 106. The inner and outer recesses 118, 120 are circumferentially offset from one another such that each inner recess 118 is located in between two outer recesses 120.

Each of the annular plates 72, 86 and 104 is preferably formed of sheet metal or other suitable flexible and heat-resistant material. Two or more sealing elements 70, 84 or 102 are preferably employed to assist in the formation of a secondary seal of the gap 11 between the rotor 14 and stator 12. The secondary sealing elements 70, 84 or 102 are oriented side-by-side and positioned within the slot 22 formed in the shoe 16, in the same manner as secondary sealing elements 48 and 50 depicted in FIG. 6. The secondary sealing elements 70, 84 and 102 may be affixed to one another, such as by welding, a mechanical connection or the like, or they may merely be placed within the slot 22 with no connection between them. The secondary sealing elements 70, 84 or 102 may be connected to one of the rotor 14 and stator 12, and they may be positioned between a front plate 60 and back plate 62 as shown in FIG. 6. The slit 78 in secondary sealing element 70, the slit 78 and cut-outs 88-92 in secondary sealing element 84 and the deflection structures 110-116 of the secondary sealing element 102 all function to enhance the radially flexibility of the respective secondary sealing elements 70, 84 and 102, compared to a continuous annular plate, so that they move inwardly and outwardly with the shoe 16 in response to the application of fluid pressure thereto and assist in the creation of a secondary seal of the gap 11 between the rotor 14 and stator 12.

Figure 11:
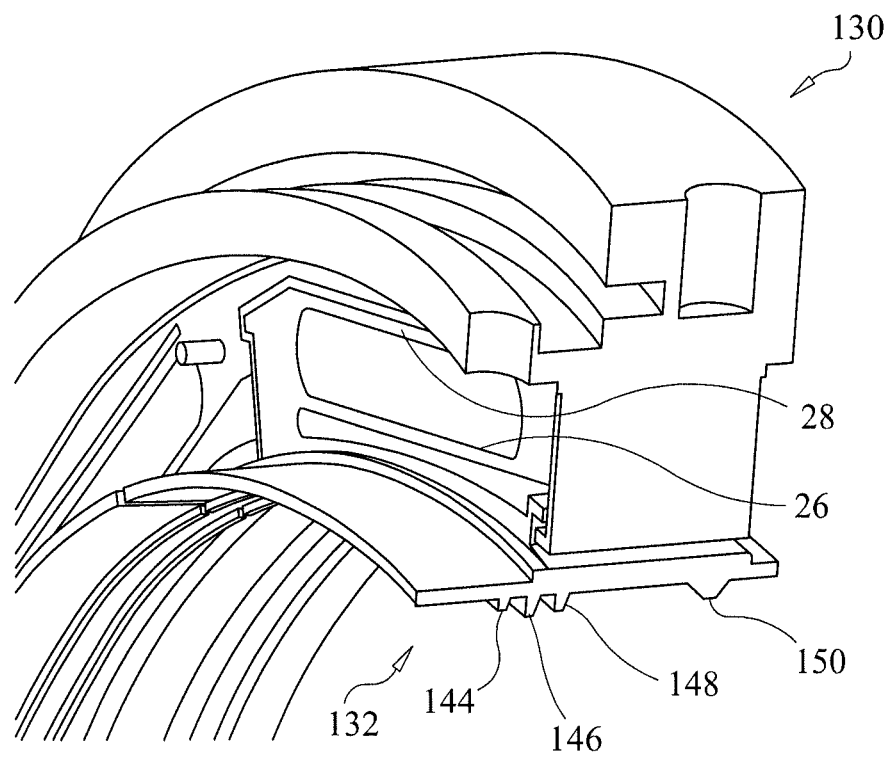
FIG. 11 is a view similar to FIG. 4 but of a further embodiment of this invention.
Figure 12:
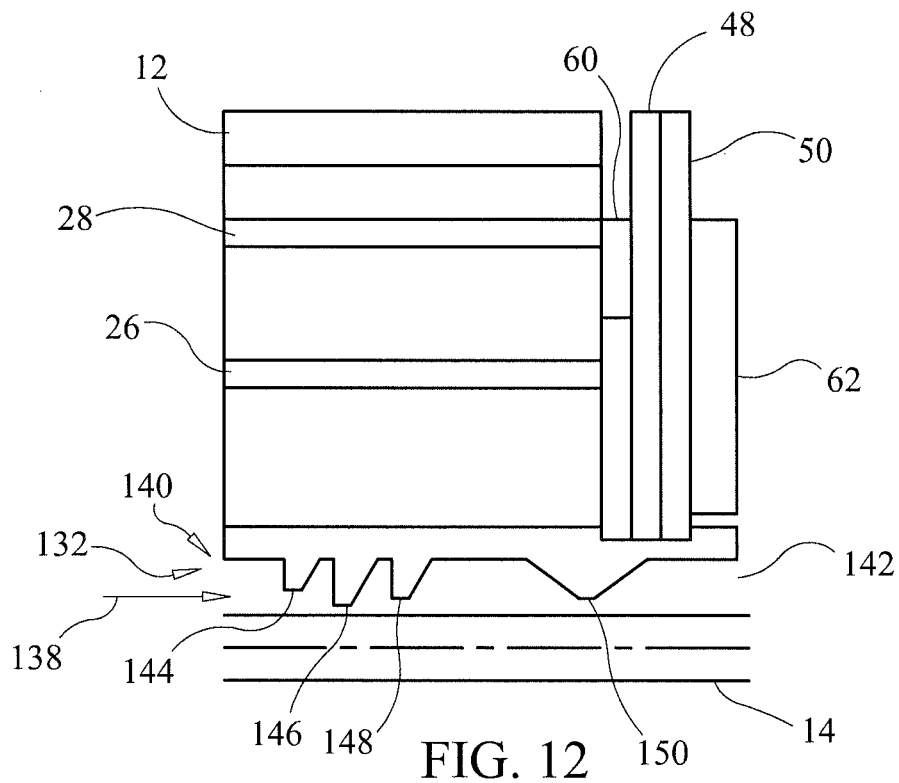
FIG. 12 is a cross sectional view of the seal depicted in FIG. 11 in position relative to a machine element.
Figure 12A:
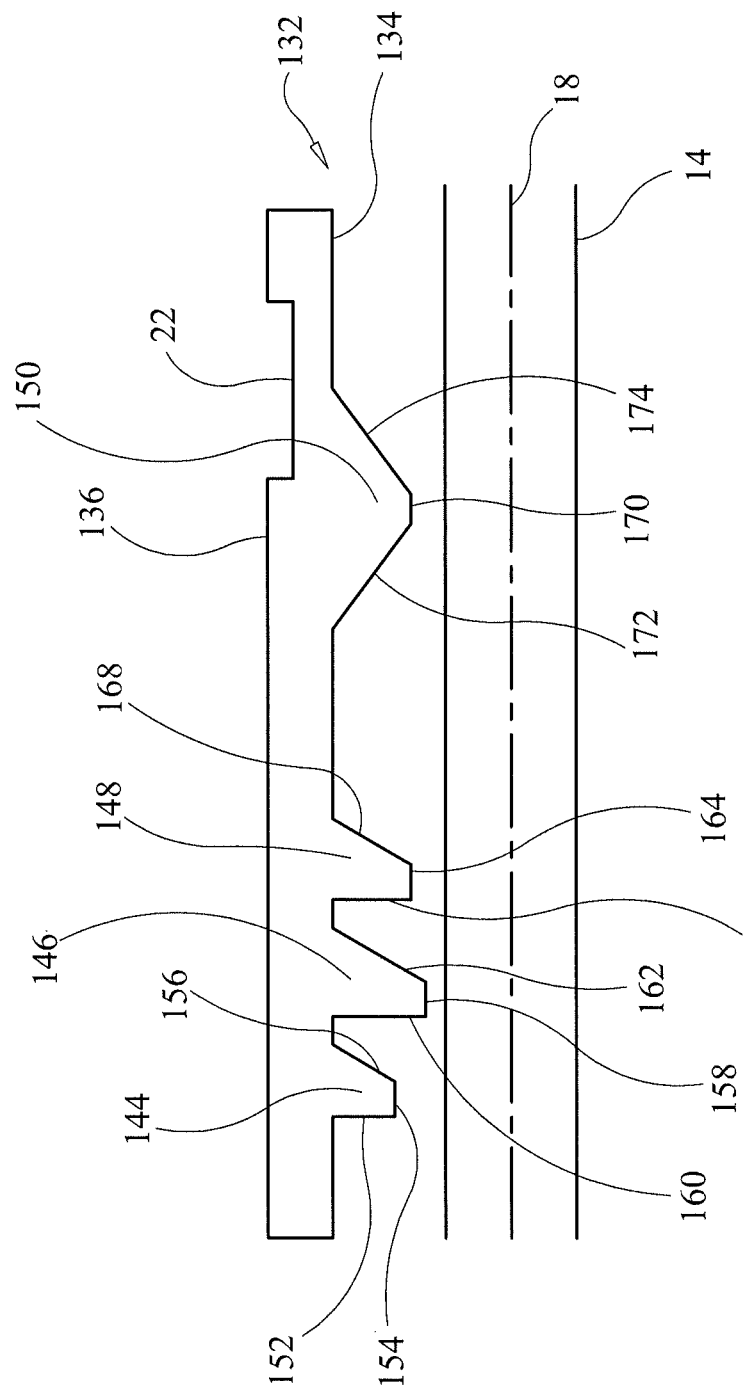
FIG. 12A is an enlarged view of a portion of the shoe shown in FIG. 12.

Referring now to FIGS. 11-12A, a further embodiment of a seal 130 according to this invention is illustrated. As noted above, the task of maintaining adequate radial tolerances in turbomachinery, and particularly gas turbine engines employed in aircraft, is complicated by a number of factors such as thermal expansion, shaft motion, tolerance stack-ups, rub tolerance, the presence of debris and the like. It is desirable to provide a non-contact seal between rotor 14 and the seal 10 described above, while limiting leakage, but it is not always possible to prevent contact between the two under all operating conditions. The seal 130 of FIGS. 11-12A includes one or more shoes 132, one of which is shown in such Figs., each having an inner surface 134 and an outer surface 136. As discussed below, the shoes 132 are specifically designed to "reset" their radial position following unintended contact with rotor 14.

The seal 130 may include essentially the same spring elements 24 and stops 30, 40, having arms 34, 42, as described above in connection with a discussion of FIGS. 3-5. Additionally, any one of the secondary sealing elements 48, 50, 70, 84 or 102 described above with reference to FIGS. 6-10A may be employed in the seal 130. In one embodiment, depicted in FIG. 12, secondary sealing elements 48 and 50 are shown positioned within a slot 22 formed in the outer surface 136 of a shoe 132 between front plate 60 and back plate 62. It is contemplated that the position of secondary sealing elements 48, 50, 70, 84 or 102 along the outer surface 136 of shoe 132 could be varied, and may be located, for example, in a position overlying tooth elements extending from the inner surface 134 of shoe 132 as discussed in detail below.

For purposes of the present discussion, a stream of fluid is presumed to be flowing over both the outer surface 136 of shoe 132 and in between the inner surface 134 of shoe 132 and the rotor 14. See the arrow 138 in FIG. 12. The fluid stream 138 is considered to be at "high" pressure on the left-hand or upstream side 140 of shoe 132 and comparatively lower pressure on the downstream side 142. The shoe 132 includes three longitudinally spaced labyrinth-type tooth elements 144, 146 and 148, all located upstream from a nozzle 150.

The tooth elements 144, 146 and 148 each project from the inner surface 134 of shoe 132 and extend in a direction toward the rotor 14. Tooth element 144 has a substantially vertical upstream surface 152, oriented at about 90° from inner surface 134, a tip 154 and a downstream surface 156 which is disposed at an angle relative to inner surface 134 of greater than 90°. The thickness of tooth element 144, as measured between its upstream and downstream surfaces 152, 156, therefore decreases from the inner surface 134 of shoe 132 toward the rotor 14. The other two tooth elements 146 and 148 have essentially the same shape as tooth element 144, but different lengths. The middle tooth element 146 has a tip 158 connected between upstream and downstream surfaces 160, 162, and the tip 164 of the third tooth element 148 is connected to its upstream and downstream surfaces 166, 168. Preferably, the middle tooth element 146 has the greatest length, as measured between the inner surface 134 of shoe 132 and its tip 158, while the tooth element 144 is shortest in length and the tooth element 148 has a length in between that of the tooth elements 144 and 146. By way of example, the length of the middle tooth element 146 may be such that its tip 158 is spaced about 0.010 inches from rotor 14, whereas the tip 154 of tooth element 144 is spaced about 0.029 inches from rotor 14 and the tip 164 of tooth element 148 is spaced about 0.019 inches from rotor 14. It should be understood that the lengths of tooth elements 144, 146 and 148, and, their spacing from rotor 14, may be varied depending upon a particular application and the desired clearance relative to rotor 14.

The nozzle 150 is preferably formed with a tip 170 connected between an upstream surface 172 and a downstream surface 174, both of which are oriented at an angle of greater than 90° relative to the inner surface 134 of shoe 132. As best seen in FIGS. 12 and 12A, the upstream surface 172 of nozzle 150 converges toward the rotor 14 whereas its downstream surface 174 diverges away from the surface of the rotor 14.

The seal 130 is initially mounted to the stator 12 in a position to create a non-contact seal of the circumferential gap 11 between the stator 12 and rotor 14, e.g. with a radial spacing from the rotor 14 within tolerances of at least about 0.010 inches, in the example given above, so that the middle tooth element 146 does not contact the rotor 14. As the fluid stream 138 passes between the inner surface 134 of shoe 132 and rotor 16, the tolerances are such that upon initial installation of the seal 130 the fluid flow is restricted to some extent. In turn, the velocity of the fluid stream 138 between the shoe 132 and rotor 14 increases causing a corresponding drop in the pressure along the inner surface 134 of the shoe 132. In response to reduced pressure acting on the inner surface 134 of the shoe 132, the force exerted by spring elements 24 and secondary sealing elements 48, 50, 70, 84 or 102 on the opposite, outer surface 136 of the shoe 132 urge it radially inwardly toward the rotor 14 to a position at which an initial seal is created. A force balance is obtained between the pressure exerted by the fluid stream 138 both on its inner and outer surface 134, 136, in combination with the force exerted by springs 24 and secondary sealing elements 48, 50, 70, 84 or 102, such that the radial spacing between the longest tooth element 146 and the rotor 14, e.g. the "initial" seal, is within desired tolerances.

Conditions within turbomachinery, and especially gas turbine engines for aircraft, are dynamic and the seal 130 is designed to dynamically respond to such conditions. In the event of inadvertent contact between the seal 130 and rotor 14 at the position where the initial seal was created, the middle tooth element 146 is first to engage the surface of the rotor 14, because it is the longest, and it begins to wear. As the middle tooth element 146 wears, the next longest tooth element 148 moves closer to the rotor 14 causing the fluid pressure beneath the shoe 132, along its inner surface 134, to increase. In turn, a force is exerted against the shoe 132 urging it in a radial direction away from the rotor 14 and against the force exerted by the fluid stream 138 on the outer surface 136 of the shoe 132 as well as the forces applied by springs 24 and the secondary sealing elements 48, 50, 70, 84 or 102 to such outer surface 136. If the radially outwardly directed force on the shoe 132 does not balance the forces exerted in the radially inward direction, the tooth element 146 will continue to wear, and tooth element 148 may begin to wear, thus moving the nozzle 150 closer to rotor 14. Such wear conditions create an increasingly greater force acting in the radially outward direction on the inner surface 134 of shoe 132, until such time as the seal 130 moves to a new or "reset" seal position wherein the force exerted by the fluid pressure on the inner surface 134 of the shoe 132 balances the force applied to the shoe 132 in the opposite direction by the fluid steam 138, the spring elements 24 and the secondary sealing elements 48, 50, 70, 84 or 102. The seal 130 therefore dynamically resets its non-contact position with respect to the rotor 14, albeit at a somewhat greater radial spacing from the rotor 14 compared to the tolerances of the initial seal at installation, but nevertheless with limited leakage within the circumferential gap 11 between the stator 12 and rotor 14.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out the invention, but that the invention will include all embodiments falling within the scope of the appended claims.

What is claimed is:

1. A seal for sealing a circumferential gap between a first machine component and a second machine component which is rotatable relative to the first machine component about a longitudinal axis, comprising:
   at least one shoe having an inner surface and an outer surface, said inner surface extending along the first machine component;
   a nozzle extending from said inner surface of said at least one shoe toward the first machine component, said nozzle having a first surface, a second surface and a nozzle tip located between said first and second surfaces, said nozzle tip being radially spaced from the first machine component;
   a first projection extending from said inner surface of said at least one shoe toward the first machine component at a location upstream from said nozzle, said first projection having a first tip which is spaced a first radial distance from the first machine component;
   a second projection extending from said inner surface of said at least one shoe toward the first machine component at a location in between said nozzle and said first projection, said second projection having a second tip which is spaced a second radial distance from the first machine component, said first radial distance being less than said second radial distance;
   at least one spring element adapted to connect to the second machine component and being connected to said second surface of said at least one shoe, said at least one spring element being effective to deflect and move with said at least one shoe in response to fluid pressure applied to said at least one shoe by a fluid stream;
   at least one secondary sealing element acting on said second surface of said at least one shoe and being effective to deflect and move with said at least one shoe in response to fluid pressure applied to said at least one shoe by the fluid stream;
   said at least one shoe being positioned relative to the first machine component in such a way as to create an increase in velocity of the fluid stream between said at least one shoe and the first machine component and a corresponding decrease in fluid pressure therebetween so that said at least one spring element and said at least one secondary sealing element urge said at least one shoe in a radially inward direction toward the first machine component to a first position at which an initial seal of the circumferential gap between the first and second machine components is created, one or both of said first projection and said second projection being effective to undergo wear in the event of contact with the first machine component in such a way that the fluid pressure between said at least one shoe and the first machine component increases to an extent whereby said at least one shoe is urged in a radially outward direction away from the first machine component to a second position at which a reset seal of the circumferential gap between the first and second machine components is created, said second position of said reset seal being radially spaced a greater distance from the first machine component than said first position of said initial seal.

2. The seal of claim 1 in which each of said first and second surfaces of said nozzle extend from said first surface of said at least one shoe at an angle in excess of 90°, said first surface converging toward the first machine component and said second surface diverging away from said first machine component.

3. The seal of claim 1 in which said first projection includes an upstream surface extending between said inner surface of said at least one shoe and said first tip at an angle of about 90° and a downstream surface extending between said inner surface of said at least one shoe and said first tip at an angle which is greater than 90°, said first projection having a thickness measured between said upstream and downstream surfaces which decreases in a direction toward said first tip.

4. The seal of claim 1 in which said second projection includes an upstream surface extending between said inner surface of said at least one shoe and said second tip at an angle of about 90° and a downstream surface extending between said inner surface of said at least one shoe and said second tip at an angle which is greater than 90°, said second projection having a thickness measured between said upstream and downstream surfaces which decreases in a direction toward said second tip.

5. The seal of claim 1 further including a third projection extending from said inner surface of said at least one shoe toward the first machine component at a location upstream from said first projection, said third projection having a third tip which is spaced a third radial distance from the first machine component, said third radial distance being greater than said first and second radial distances.

6. The seal of claim 5 in which said third projection includes an upstream surface extending between said inner surface of said at least one shoe and said third tip at an angle of about 90° and a downstream surface extending between said inner surface of said at least one shoe and said third tip at an angle which is greater than 90°, said at least one third projection having a thickness measured between said upstream and downstream surfaces which decreases in a direction toward said third tip.

7. The seal of claim 1 in which said wear of one or both of said first and second projections causes said at least one shoe to move radially inwardly relative to the first machine component thereby increasing the fluid pressure acting in a radially outward direction on said at least one shoe, said second position of said at least one seal being defined by the point at which a balance of forces is obtained between the forces acting on said inner surface of said at least one shoe created by the fluid pressure of the fluid stream and the forces acting on said outer surface of said at least one shoe applied by said at least one spring element and said at least one secondary sealing element.

* * * * *